United States Patent
Convery

(10) Patent No.: US 11,931,746 B2
(45) Date of Patent: Mar. 19, 2024

(54) APPARATUS FOR PROCESSING AGGREGATE MATERIAL

(71) Applicant: CDE Global Limited, Cookstown (GB)

(72) Inventor: Anthony Convery, Moneymore (GB)

(73) Assignee: CDE Global Limited, Cookstown (GB)

( * ) Notice: Subject to any disclaimer, the term of this patent is extended or adjusted under 35 U.S.C. 154(b) by 0 days.

(21) Appl. No.: 17/871,967

(22) Filed: Jul. 24, 2022

(65) Prior Publication Data
US 2023/0024835 A1    Jan. 26, 2023

(30) Foreign Application Priority Data

Jul. 23, 2021 (GB) .................................... 2110627

(51) Int. Cl.
| | |
|---|---|
| B03B 5/02 | (2006.01) |
| B03B 5/52 | (2006.01) |
| B03B 5/62 | (2006.01) |
| B03B 11/00 | (2006.01) |

(52) U.S. Cl.
CPC ............... B03B 5/623 (2013.01); B03B 5/02 (2013.01); B03B 5/52 (2013.01); *B03B 2011/002* (2013.01)

(58) Field of Classification Search
CPC .. B03B 5/623; B03B 5/02; B03B 5/52; B03B 2011/002; B03B 5/56; B03B 5/626; B07B 2230/01; B08B 3/042
USPC .......................................................... 209/464
See application file for complete search history.

(56) References Cited

U.S. PATENT DOCUMENTS

| | | | |
|---|---|---|---|
| 15,827 A | | 9/1856 | Thomas |
| 998,573 A | * | 7/1911 | Gow |
| 1,609,652 A | | 12/1926 | McQueen |
| 1,695,021 A | | 12/1928 | Puryear |
| 2,002,978 A | | 5/1935 | Davis |
| 2,025,841 A | | 12/1935 | Young |
| 2,378,356 A | | 6/1945 | Erck |
| 3,807,558 A | | 4/1974 | Hamm |
| 4,272,363 A | | 6/1981 | Cargile, Jr. |
| 5,015,393 A | * | 5/1991 | Russell ............... B01D 21/2433 210/776 |
| 5,896,997 A | | 4/1999 | Tanner |
| RE38,367 E | | 12/2003 | Southall |

(Continued)

FOREIGN PATENT DOCUMENTS

| | | | | |
|---|---|---|---|---|
| CN | 101384326 A | * | 3/2009 | ........... B01D 21/283 |
| CN | 203725248 | | 7/2014 | |

(Continued)

*Primary Examiner* — Gene O Crawford
*Assistant Examiner* — Muhammad Awais
(74) *Attorney, Agent, or Firm* — Gardner, Linn, Burkhart & Ondersma LLP

(57) ABSTRACT

An apparatus for processing aggregate material includes a chassis, a trough mounted on the chassis at an inclined angle, and at least one shaft rotatably mounted within the trough and extending from a lower to an upper end of the trough. The at least one shaft has blades mounted thereon, the blades being angled so that they carry material within the trough towards the upper end of the trough when the at least one shaft is in a normal direction of rotation. A discharge opening is formed in a base of the trough adjacent the upper end of the trough, a weir being provided in the trough upstream of the discharge opening over which processed material must pass to reach the discharge opening.

7 Claims, 2 Drawing Sheets

(56) References Cited

U.S. PATENT DOCUMENTS

| | | | |
|---|---|---|---|
| 7,514,011 | B2 | 4/2009 | Kulbeth |
| 7,690,513 | B1 * | 4/2010 | Gustin ..................... B03B 5/02 |
| | | | 209/465 |
| 7,954,642 | B2 | 6/2011 | Jody et al. |
| 8,151,993 | B2 | 4/2012 | Smith |
| 9,327,291 | B2 | 5/2016 | Brodt |
| 9,486,811 | B2 | 11/2016 | Weber |
| 10,016,764 | B2 * | 7/2018 | Ivanoff ..................... B03B 9/00 |
| 2003/0155278 | A1 | 8/2003 | Mirras |
| 2010/0270216 | A1 * | 10/2010 | Burnett ............. B01D 33/0376 |
| | | | 209/606 |
| 2017/0361332 | A1 | 12/2017 | Bennington |
| 2019/0076895 | A1 | 3/2019 | Estep et al. |
| 2020/0070178 | A1 * | 3/2020 | Heron ..................... B03B 5/40 |

FOREIGN PATENT DOCUMENTS

| | | | |
|---|---|---|---|
| CN | 204338307 | | 5/2015 |
| CN | 204953098 | | 1/2016 |
| CN | 204953098 U | * | 1/2016 |
| EP | 0228724 | | 7/1987 |
| EP | 3225312 | | 4/2017 |
| EP | 3225312 A1 | * | 10/2017 ............. B03B 11/00 |
| GB | 2523657 | | 9/2015 |
| GB | 2523658 | | 9/2015 |

\* cited by examiner

APPARATUS FOR PROCESSING AGGREGATE MATERIAL

CROSS REFERENCE TO RELATED APPLICATION

The present application claims priority benefit of U.K. Pat. Application Ser. No. 2110627.3, filed Jul. 23, 2021, which is hereby incorporated herein by reference in its entirety.

FIELD OF THE INVENTION

This invention relates to an apparatus for processing aggregate material and, in particular, to an apparatus for removing clay contaminants and other deleterious materials from aggregate material.

BACKGROUND OF THE INVENTION

In the production of aggregate materials, such as sand, gravel, crushed rock, scalpings and iron and other mineral ores, the desired product material will often be contaminated with clay or other soils, organic material. In order to prepare such aggregate product material for market, it is necessary to process the product material so that it is free from such contaminants.

For heavily contaminated aggregate materials this is often achieved in what is known as a "logwasher". A logwasher typically comprises a trough mounted at an inclined angle relative to horizontal to which water is added, the feed material being delivered into a lower end of the trough. A pair of parallel shafts or logs are rotatably mounted within the trough and are driven to rotate in opposite directions. Each shaft has a plurality of paddles or blades mounted thereon, usually mounted to the shaft at an angle, the paddles on adjacent shafts being staggered so that mud balls and other clumps of material are broken down by attrition of the material between the blades of the adjacent shafts. The blades are angled so that they carry the product material towards the raised end of the trough, where the separated and washed product material is discharged via an opening in the base of the trough, typically onto a grading and/or dewatering screen.

Typically the retention time of material within the log washer, and hence the degree of attrition of the feed material, is determined by the angle of the trough and its length. The steeper the angle and the longer the trough the greater the retention time and hence attrition. However, increasing the angle of inclination and length of the log 10 washer increases the size of the equipment. Furthermore, the length and angle of the trough determine the water level within the trough and it is therefore difficult to adjust the water level within the trough of a log washer after installation.

SUMMARY OF THE INVENTION

According to the present invention there is provided an apparatus for processing aggregate material comprising a chassis, a trough mounted on the chassis at an inclined angle, at least one shaft rotatably mounted within the trough and extending from a lower to an upper end of the trough, the at least one shaft having blades mounted thereon, wherein the blades are angled so that they carry material within the trough towards an upper end of the trough when the at least one shaft is in a normal direction of rotation, a discharge opening being provided in a base of the trough adjacent the upper end of the trough, a weir being provided in the trough upstream of the discharge opening over which processed material must pass to reach the discharge opening.

In one embodiment a pair of parallel shafts may be rotatably mounted within the trough, a drive assembly being provided for driving the shafts in opposite directions, each shaft having a plurality of blades mounted thereon, the blades on the adjacent shafts being staggered such that the blades on the adjacent shafts can pass between one another during rotation of the shafts.

The apparatus may further comprise a water supply adapted to add water to the trough, such as via spray bars.

The weir may extend transversely across the width of the trough. Preferably the weir is located upstream of the blades.

In one embodiment the weir may be removably mounted within the trough permitting replacement of the weir, preferably facilitating selection of a weir from a plurality of weirs of differing height. The weir may be mounted in supports provided on opposite sides of the trough. The supports may define mounting slots into which respective sides of the weir may be inserted. Each mounting slot may be defined between respective spaced apart parallel plates. Alternatively the weir may be secured to the base of the trough, such as via a centrally located mounting arrangement.

In one embodiment the weir may be adjustable in height. The weir may be adapted to be adjusted in height by adjusting the angle of the weir with respect to the base of the trough. The weir may be pivotally mounted in the trough to permit adjustment of the height of the weir.

In one embodiment a dewatering screen may be mounted beneath the discharge opening of the trough.

The intention of the internal weir is to act as an artificial angle increase within the trough, whereby the weir will hold back material to a degree, increasing retention time and creating extra attrition and ultimately increasing material scrubbing efficiency. A secondary result of the weir may also be to increase the potential water level inside the trough for a given length.

These and other objects, advantages, purposes and features of the present invention will become apparent upon review of the following specification in conjunction with the drawings.

BRIEF DESCRIPTION OF THE DRAWINGS

An apparatus for processing aggregate material in accordance with an embodiment of the present invention will now be described, by way of example only, with reference to the accompanying drawings, in which.

DETAILED DESCRIPTION OF THE DRAWINGS

Figure 1:
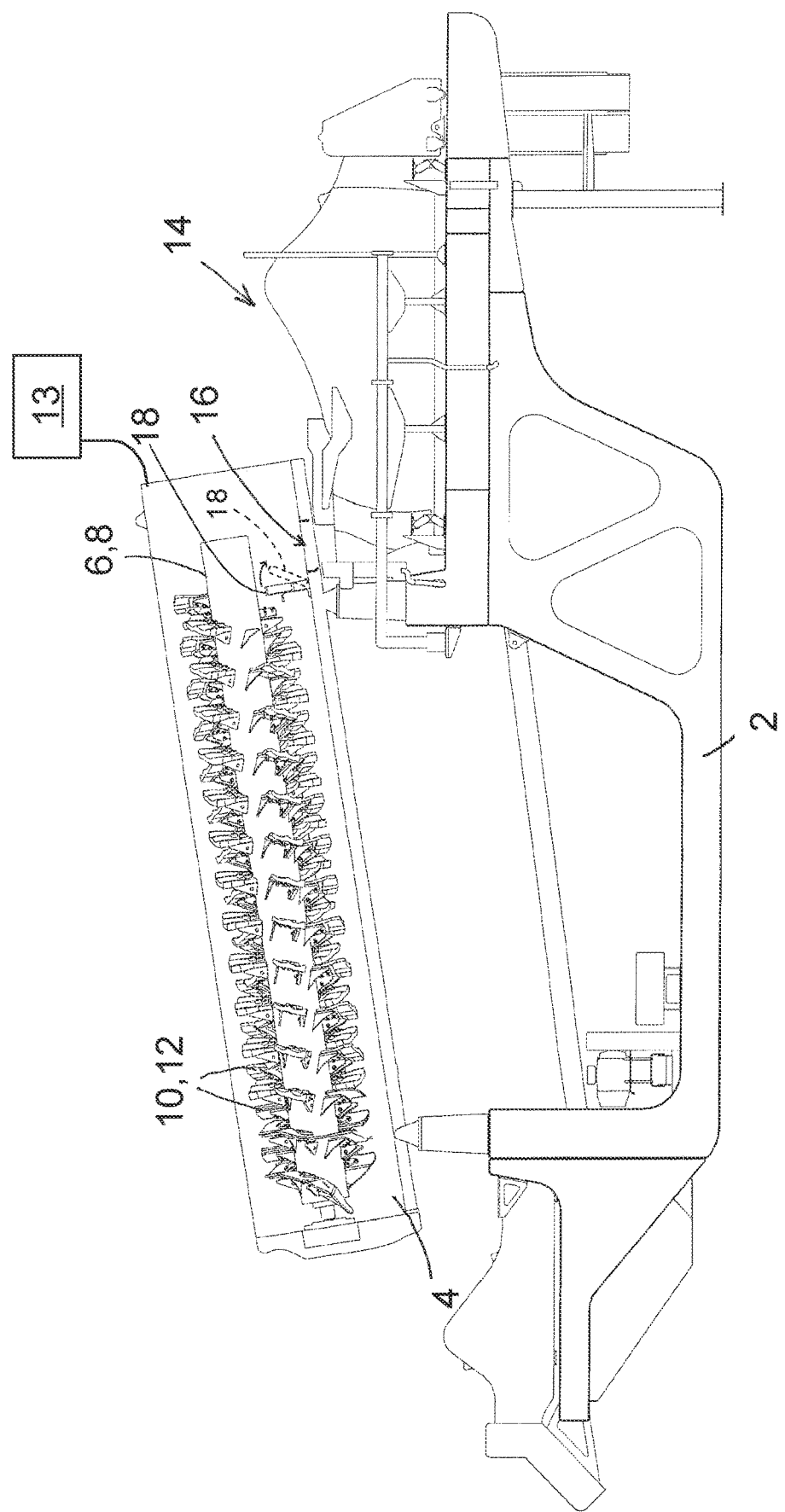
FIG. 1 is a side elevation view of an aggregate processing apparatus in accordance with an embodiment of the present invention.
Figure 2:
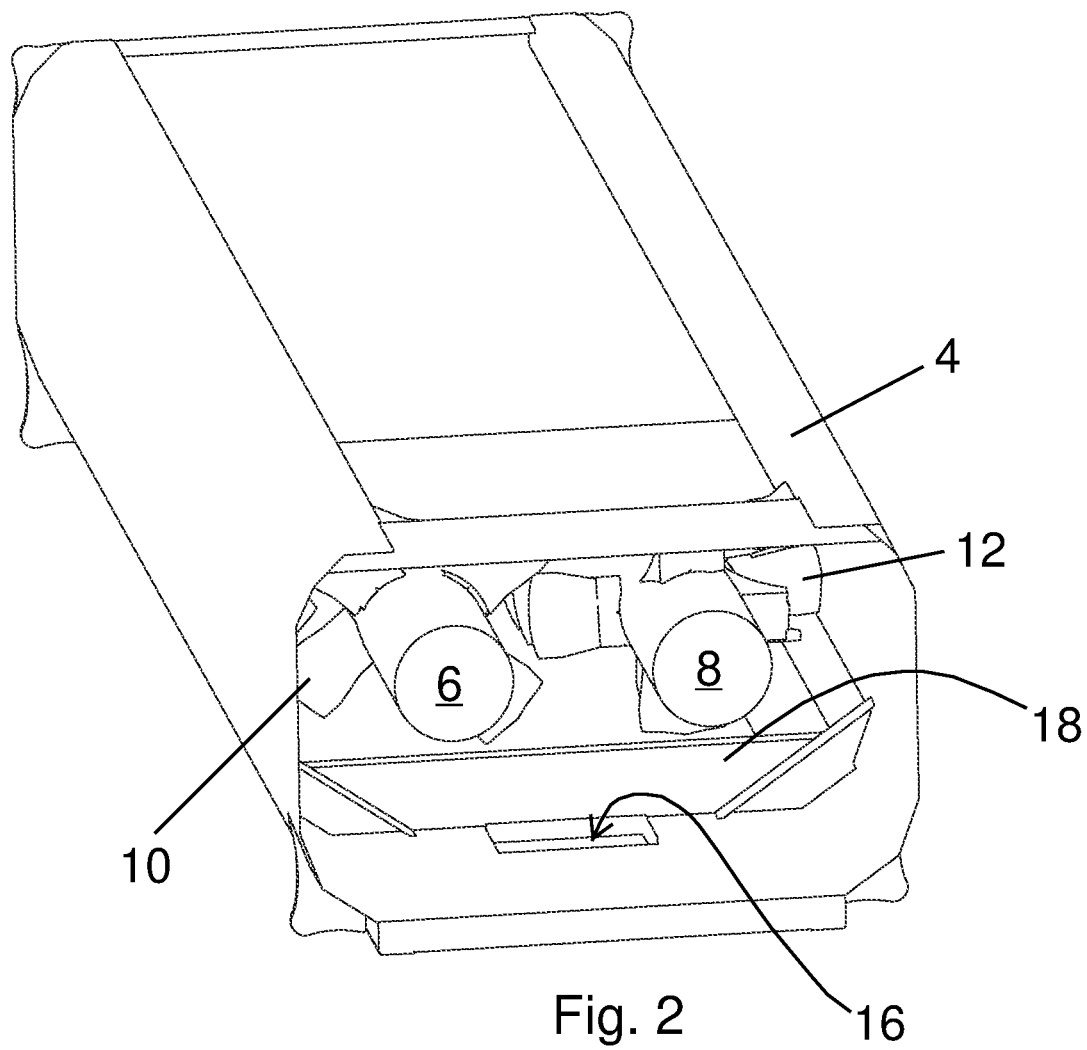
FIG. 2 is a sectional end perspective view of the trough of the apparatus of FIG. 1.
Figure 3:
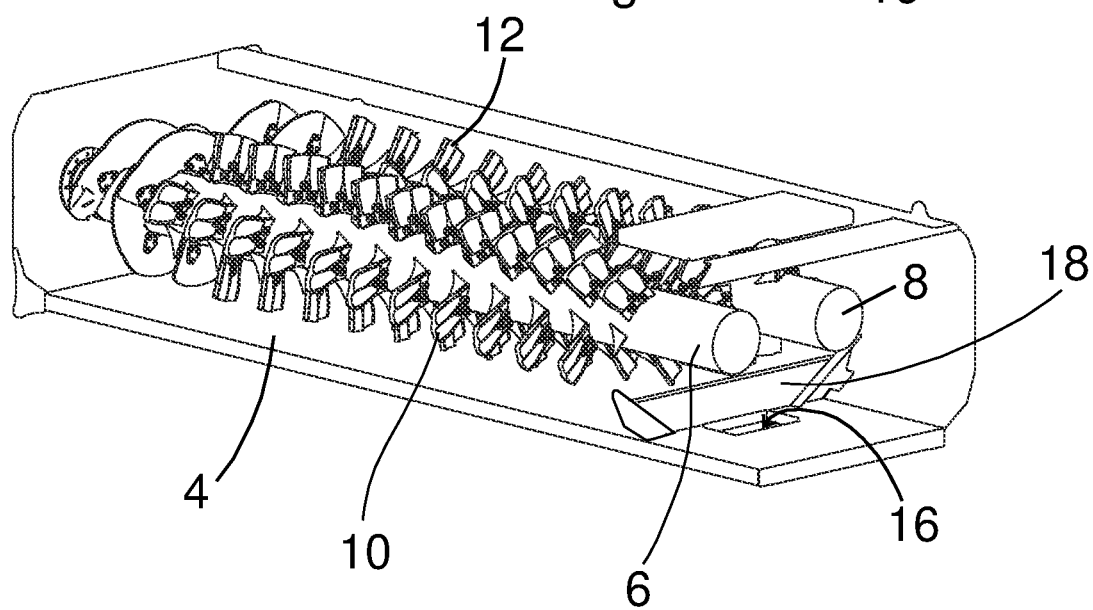
FIG. 3 is a sectional side perspective view of the trough of the apparatus of FIG. 1.

An apparatus for processing aggregate material in accordance with an embodiment of the present invention, as illustrated in FIGS. 1 to 5, comprises a chassis 2 upon which is mounted a logwasher comprising a trough 4 mounted on the chassis 2 at an inclined angle, a pair of parallel shafts 6,8 rotatably mounted within the trough 4 extending from a lower to an upper end of the trough 4. One or more electric electric motors (not shown) may be being provided for driving the shafts in opposite directions, such as via a gearbox or drive belt/chain. Each shaft 6,8 has a plurality of blades 11,12 mounted thereon. The blades 10,12 on the adjacent shafts 6,8 are staggered such that the blades 10,12 on the adjacent shafts 6,8 can pass between one another during rotation of the shafts 6,8. The blades 10,12 are angled so that they carry material within the trough towards an upper end of the trough 4 when the shafts 6,8 are rotated in a normal direction of rotation while scrubbing the material to separate and break up contamination stuck to the material.

Spray bars (not shown) connected to a water supply 13 are provided for adding water to the trough 4.

The trough 4 may be adjustably mounted on the chassis 2 to enable adjustment of the angle of inclination of the trough 4. The angle of trough may be increased or decreased for different retention times.

A dewatering and/or grading screen 14 is mounted on the chassis 2 beneath the upper end of the trough 4 of the log washer arranged to receive processed aggregate material from discharge opening 16 in the base of the trough 4.

A weir 18 is mounted within the trough 4, extending transversely across the width of the trough 4 between the side walls of the trough, such that processed material must pass over the weir 18 to reach the discharge opening 16. In the illustrated embodiment, the weir 18 extends perpendicular to the base of the trough 4, upstream of the discharge opening 16. The weir 18 may be mounted within the trough 4 to be readily removable from the trough 4, permitting the weir to be interchanged from one of a selection of weirs of differing height to facilitate adjustment of the height of the weir 18 and therefore adjustment of the retention time of material within the through and adjustment of the water level within the trough 4. For example, the ends of the trough 4 may be located within mounting slots provided on either side of the trough 4, the mounting slots being defined by respective pairs of spaced apart and parallel plates provided on the sides walls of the trough 4. Alternatively the trough 18 may be fixed in placed within the trough 4, for example by means of welds or suitable fasteners.

In an alternative embodiment, represented by phantom lines and a curved arrow in FIG. 1, the height of the weir 18 within the trough 4 may be adjustable, for example by adjusting the angle of the weir 18 with respect to the base of the trough 4. The weir 18 may be defined by a pivotally mounted ramped member mounted in the base of the trough 4 to extend transersely across the width of the trough 4, whereby the height of the weir 18 may be adjusted by pivoting the weir 18 with repect to the base of the trough 4. An actuator may be provided for adjusting the angle and therefore height of the weir 18.

In use, a feed material, comprising an aggregate material contaminated with clay and other deleterious materials, is fed into the lower end of the trough 4, to which water has been added, and the shafts 6,8 are rotated such that the blades 10,12 cause attrition of the material, breaking up the clay and soil bound to the aggregate material, causing intense scrubbing to separate the aggregate material from any contamination. The angle of the blades causes the aggregate material to be conveyed up the trough towards the discharge opening 16 in the base of the trough 4 adjacent the upper end thereof, from which opening the cleaned aggregate material falls onto an upper deck of the grading/dewatering screen 14. During such process further water is added to the trough 4 via the spray bar. Excess water and removed contamints may be removed from the lower end of the trough 4 via a suitable outlet or outlets.

The weir 18 defines the water level with the trough 4 and also holds back material within the trough to a degree, increasing retention time and creating extra attrition and ultimately increasing material scrubbing efficiency, before the material passes over the weir 18 to reach the discharge opening 16.

The invention is not limited to the embodiments described herein but can be amended or modified without departing from the scope of the present invention, which is intended to be limited only by the scope of the appended claims as interpreted according to the principles of patent law including the doctrine of equivalents.

The invention claimed is:

1. An apparatus for processing aggregate material, said apparatus comprising:
    a chassis;
    a trough mounted on said chassis at an inclined angle;
    at least one shaft rotatably mounted within said trough and extending from a lower end to an upper end of said trough;
    said at least one shaft having blades mounted thereon, wherein said blades are angled so that they carry material within said trough towards said upper end of said trough when said at least one shaft is in a normal direction of rotation;
    a discharge opening formed in a base of said trough adjacent said upper end of said trough; and
    a weir in said trough upstream of said discharge opening over which processed aggregate material must pass to reach said discharge opening, wherein said weir is adapted to be adjusted in height by adjusting the angle of said weir with respect to said base of said trough.

2. The apparatus of claim 1, wherein said at least one shaft comprises a pair of parallel shafts rotatably mounted within said trough, each of said shafts having a plurality of said blades mounted thereon in staggered arrangement such that said blades on said adjacent shafts can pass between one another during rotation of said shafts, said apparatus further comprising a drive assembly for driving said shafts in opposite directions.

3. The apparatus of claim 1, further comprising a water supply adapted to add water to said trough.

4. The apparatus of claim 1, wherein said weir extends transversely across the width of said trough.

5. The apparatus of claim 1, wherein said weir is located downstream of said blades.

6. The apparatus as claimed in claim 1, wherein said weir is pivotally mounted in said trough to permit adjustment of the height of said weir.

7. The apparatus of claim 1, wherein at least one of a dewatering or a grading screen is mounted beneath said discharge opening of said trough.

* * * * *